(No Model.) 2 Sheets—Sheet 1.
J. AGENTEN.
REEL DRIVING GEAR FOR HARVESTERS.
No. 384,109. Patented June 5, 1888.
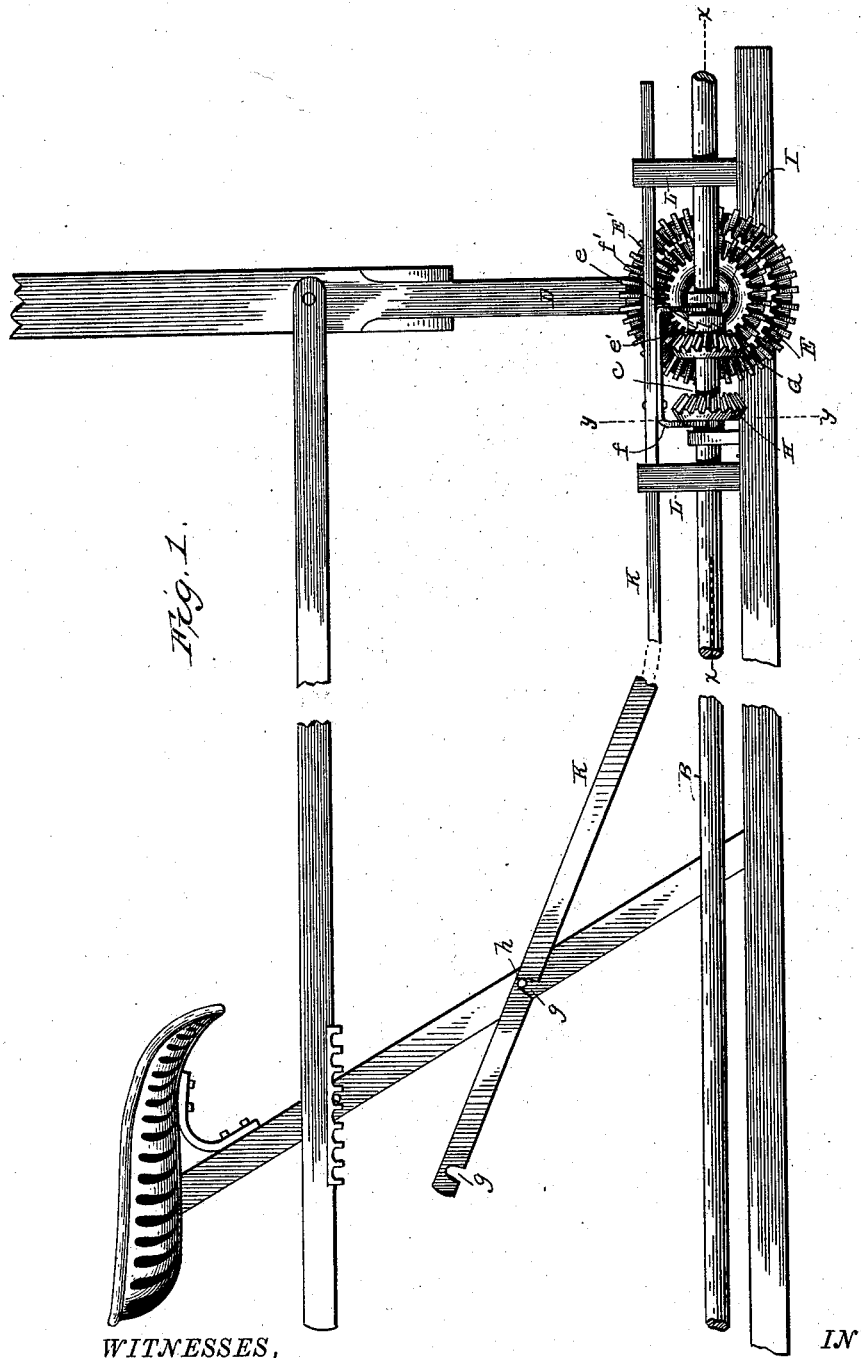
WITNESSES,
Edwin T. Yewell.
F. T. Chapman.
INVENTOR.
Joseph Agenten.
By Phil. T. Dodge, Attorney.

(No Model.) 2 Sheets—Sheet 2.
J. AGENTEN.
REEL DRIVING GEAR FOR HARVESTERS.
No. 384,109. Patented June 5, 1888.
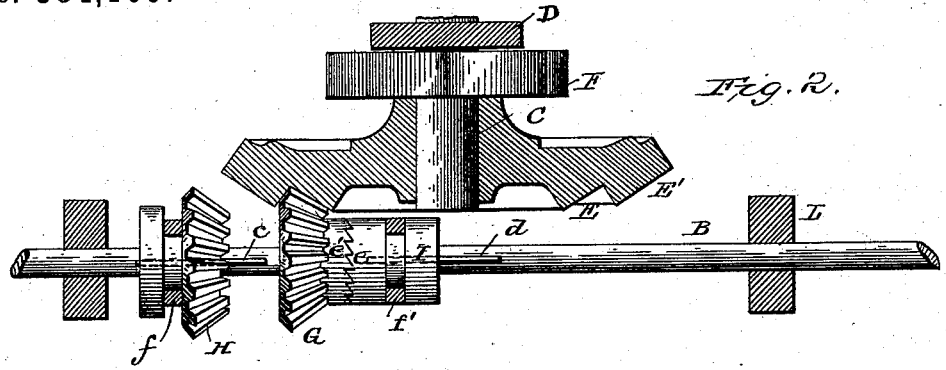
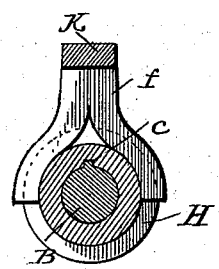
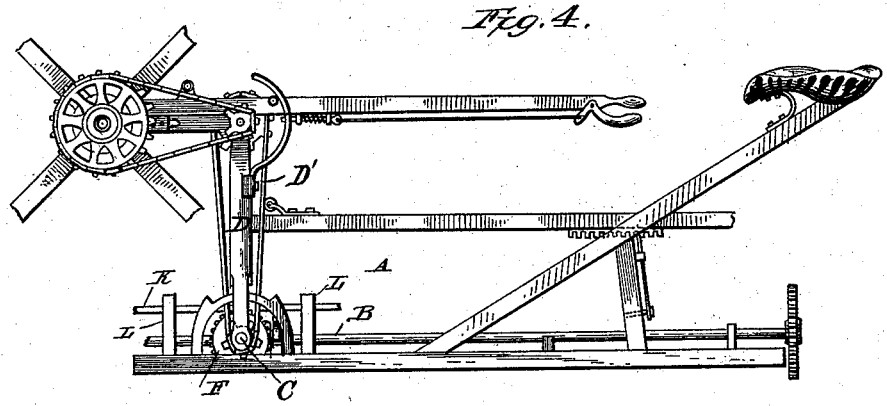
WITNESSES.
INVENTOR.

UNITED STATES PATENT OFFICE.

JOSEPH AGENTEN, OF SHEBOYGAN, ASSIGNOR TO THE ESTERLY HARVESTING MACHINE COMPANY, OF WHITEWATER, WISCONSIN.

REEL-DRIVING GEAR FOR HARVESTERS.

SPECIFICATION forming part of Letters Patent No. 384,109, dated June 5, 1888.

Application filed December 22, 1887. Serial No. 258,718. (No model.)

*To all whom it may concern:*

Be it known that I, JOSEPH AGENTEN, of Sheboygan, in the county of Sheboygan and State of Wisconsin, have invented certain Improvements in Reel-Driving Gear for Harvesters, of which the following is a specification.

My invention relates to a peculiar combination of gearing for imparting to a harvester-reel variable speed in the one direction subject to the control of the driver.

My gearing is intended more particularly for use in connection with a harvester-reel mounted and driven in the manner represented in Letters Patent to George Esterly, No. 306,681, dated October 14, 1884, and I have therefore represented the same in such connection in the accompanying drawings.

It will be understood that with the exception of the details hereinafter specifically described the parts represented in the drawings may be identical with those described in the patent above referred to.

In the accompanying drawings, Figure 1 represents a side elevation of the reel-standard and my improved driving mechanism at its foot. Fig. 2 is a horizontal section through the gearing on the line $x$ $x$ of Fig. 1. Fig. 3 is a horizontal section on the line $y$ $y$. Fig. 4 is an outline elevation showing the reel-standard, the reel, and the entire driving mechanism.

Referring to the drawings, A represents a portion of the main or wheel frame of the harvester, and B the horizontal reel-driving shaft, mounted in suitable bearings, extending in a fore-and-aft direction and receiving, through suitable gearing, arranged in any ordinary or approved manner, a continuous rotation in one direction.

C represents a horizontal shaft, mounted in bearings on the frame at right angles to the driving-shaft B, and forming the axis for the lower end of the reel-standard D, which is free to tip forward and backward in order to change the position of the reel in the usual manner. The shaft C terminates at one end near the side of the driving-shaft B, and carries upon its inner end two concentric beveled gears, E and E', of different diameters. These two gears are commonly cast in one piece, with their active faces in the same vertical plane, and they are both secured to or formed integral with a sprocket-pinion, F, from which the driving-chain D' is extended upward to the driving devices immediately connected with the reel, as usual.

The driving-shaft B is provided with two beveled pinions, G and H, of equal or substantially equal diameters, the former being mounted freely on the shaft and arranged to remain at all times in engagement with the gear E, but the latter arranged to slide on the shaft and connected thereto by a spline, $c$, so that it may be thrown into or out of engagement with the gear E' at the will of the attendant. The shaft is further provided with a sliding clutch, I, connected thereto by a spline, $d$, and provided at its inner end with teeth $e$, adapted to engage the corresponding teeth $e'$ on the pinion G, so that when the clutch is engaged with the pinion it will impart motion thereto. A reciprocating bar, K, arranged to slide in guides L, or otherwise supported, is provided with forked arms $f$ and $f'$, the former engaging a peripheral groove in the hub of the pinion H, and the latter entering the peripheral groove in the clutch I. At one end the bar K is extended upward in such position that it may be conveniently grasped and moved forward or backward by the driver while in his seat. It is provided, as shown, with two notches, $g$, adapted to receive a stationary pin, $h$, by which it may be secured in either of its two positions. If preferred, a suitable lever may be arranged to operate the bar K; but as this lever forms no part of my invention, it is deemed unnecessary to illustrate the same in the drawings.

When the shifting-bar K is moved rearward, the parts assume the position represented in Fig. 1, the pinion H being disengaged from the wheel E and revolving idly, while the clutch I is engaged with the pinion G, imparting motion from the driving-shaft thereto, and causing the pinion through the gear $e$ to impart a rapid speed to the reel. When the bar K is moved forward, it advances both the clutch I and the pinion H, the effect of which is to disengage the clutch from the pinion G, so that it may turn loosely on the shaft, and at the same time to place the pinion H in engagement with the gear E', so that it will impart thereto from the shaft a relatively slow motion.

By the above described gearing the operator is enabled to increase or diminish the speed of the reel at will and with slight effort, and without stopping the motion of either the machine or reel. In operating in the field it is found that the character or condition of the grain varies at frequent intervals in such manner as to render a change in the speed of the reel advantageous, and it is to secure this advantage that my gearing is designed. Besides, this arrangement does away entirely with the wear and rattle caused by the slow gear while idly running with the high-speed gear.

Having thus described my invention, what I claim is—

In a harvester and in combination with a reel, a driving mechanism therefor, consisting of the sprocket-wheel and the concentric gears E E', of different diameters, secured thereto, the driving-shaft B, the freely-rotating pinion G thereon, the sliding pinion H and sliding clutch, both splined to the shaft, and a shifting device, substantially as described, acting to throw the clutch I and pinion H into action alternately, substantially as set forth.

In testimony whereof I hereunto set my hand, this 8th day of September, 1887, in the presence of two attesting witnesses.

JOSEPH AGENTEN.

Witnesses:
C. H. MAYNARD,
VAL DETLING.